Patented Sept. 26, 1933

1,927,965

UNITED STATES PATENT OFFICE 1,927,965

VAT DYESTUFFS OF THE ANTHRAQUINONE SERIES

Oskar Unger, Ludwigshafen-on-the-Rhine, and Georg Boehner, Edingen-on-the-Neckar, Germany, assignors to General Aniline Works Inc., New York, N. Y., a corporation of Delaware No Drawing. Application May 3, 1929, Serial No. 360,322, and in Germany May 10, 1928

4 Claims. (Cl. 260—60)

The present invention relates to the production of vat dyestuffs of the anthraquinone series containing sulphur.

We have found that valuable vat dyestuffs of the anthraquinone series, namely the technically important C-diaryl-2.1-(S)-6.5-(S)-anthraquinonedithiazoles, can be advantageously prepared by treating with sulphur, or agents furnishing the same, the imidechlorides of 2.6-diaroyl-diaminoanthraquinone or substitution products thereof corresponding to the general formula

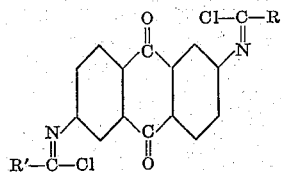

in which R and R' stand for aryl radicals. The said imidechlorides can be obtained, for example, by the action of phosphorus pentachloride on 2.6-diaroyl-diaminoanthraquinones, the latter being obtainable according to Bulletin de la Société Chimique de France (4) Vol. 29, 1921, pages 1027 to 1036. If the sulphurizing of the imidechlorides be performed under mild conditions, for example at low temperature, intermediate products can be obtained which, from their analytical data and reactions are probably 2.6-bis-arylmercaptomethyliminoanthraquinones of the general formula:

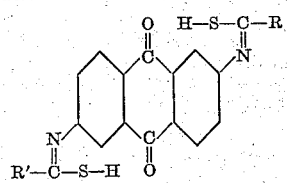

in which R and R' stand for aryl radicals.

By treatment with dehydrogenating agents, these intermediate products can readily be transformed into the corresponding thiazoles. Dehydrogenating agents comprise acid as well as alkaline agents. Acid dehydrogenating agents are for example sulphuric acid, chlorosulfonic acid and the like, to which an oxidizing agent, for instance manganese dioxide, may be added. Alkaline oxidizing agents, for example caustic alkali solution containing potassium ferricyanide, may also be used.

The following examples will further illustrate the nature of the invention which however is not restricted to these examples. The parts are by weight.

Example 1

20 parts of 2.6-bis-phenylchlormethyliminoanthraquinone, obtainable in the form of yellow needles melting at about 256° centigrade by treating 2.6-dibenzoyldiaminoanthraquinone with phosphorus penta-chloride, are heated with 80 parts of naphthalene and 40 parts of sulphur, under a reflux condenser, until no imidechloride remains.

The cooled melt is freed from naphthalene by extraction with an organic solvent. The C-diphenyl-2.1-(S)-6.5-(S)-anthraquinonedithiazole thus obtained remains behind in the form of a yellow green powder.

Example 2

20 parts of potassium hydroxide are dissolved in 200 parts of alcohol and the solution is saturated with sulphuretted hydrogen. 20 parts of 2.6-bis-phenylchlormethyliminoanthraquinone are then added, and the mixture is boiled under a reflux condenser until all the 2.6-bis-phenylchlormethyliminoanthraquinone has disappeared. The mixture is then diluted with hot water until solution is effected, being then filtered, and the yellow brown filtrate is treated with hydrochloric acid and worked up in the usual manner. The reaction product is a yellow amorphous substance, which dissolves to a yellow solution in dilute caustic alkalis, and may be regarded as 2.6-bis-phenylmercaptomethyliminoanthraquinone. The reaction product is soluble in trichlorobenzene, from which it crystallizes out, on cooling in the form of brown-yellow acicular tufts, and melts at above 360° centigrade.

Example 3

20 parts of the reaction product described in Example 2 are dissolved in 400 parts of a 96 per cent sulphuric acid solution, the solution being then warmed to about 110° centigrade until the formation of the dyestuff is completed. After cooling, the reaction mass is diluted with water, and the precipitated C-diphenyl-2.1-(S)-6.5-(S)-anthraquinonedithiazole is further treated in the usual manner.

If the 96 per cent sulphuric acid solution be replaced by chlorosulphonic acid or sulphuric monohydrate, or a mixture of these acids, the formation of the dyestuff occurs at lower temperatures.

In the above described preparation of the dithiazole from 2.6-bis-phenylmercaptomethyliminoanthraquinone, oxidizing agents, such as manganese dioxide, may be added to the sulphuric acid.

The conversion of the intermediate product, described in Example 2, into C-diphenyl-2.1-(S)-6.5-(S)-anthraquinonedithiazole can also be effected in an alkaline medium, for example by boiling with a solution of potassium ferricyanide containing caustic alkali.

What we claim is:

1. As a new article of manufacture 2.6-bisphenylmercaptomethyliminoanthraquinone probably corresponding to the formula:

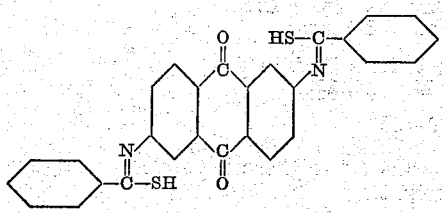

crystallizing in the form of brown yellow acicular tufts from trichlorbenzene, melting above 360° centigrade and dissolving in dilute caustic alkali solution giving a yellow solution.

2. In the production of intermediate products and vat dyestuffs of the anthraquinone series containing sulphur the step, which comprises heating an imidechloride of a 2.6-dibenzoyldiaminoanthraquinone with a sulphurizing agent.

3. In the production of intermediate products and vat dyestuffs of the anthraquinone series containing sulphur the step, which comprises heating an imidechloride of a 2.6-dibenzoyldiaminoanthraquinone with sulphur in naphthalene.

4. In the production of intermediate products and vat dyestuffs of the anthraquinone series containing sulphur the step, which comprises heating the imidechloride of 2.6-dibenzoyldiaminoanthraquinone with sulphur in naphthalene.

OSKAR UNGER.
GEORG BOEHNER.